ELECTRICAL CIRCUITS EMPLOYING IMPACT IONIZATION DEVICES

Filed July 21, 1958

2 Sheets-Sheet 1

INVENTORS
GERALD B. HERZOG & MARTIN C. STEELE
BY
Morris A. Rabkin
ATTORNEY

INVENTORS
GERALD B. HERZOG &
MARTIN C. STEELE
BY
Morris A. Rabkin
ATTORNEY

United States Patent Office 3,118,071

Patented Jan. 14, 1964

3,118,071

ELECTRICAL CIRCUITS EMPLOYING IMPACT IONIZATION DEVICES

Gerald B. Herzog and Martin C. Steele, Princeton, N.J., assignors to Radio Corporation of America, a corporation of Delaware Filed July 21, 1958, Ser. No. 749,894

15 Claims. (Cl. 307—88.5)

The present invention relates to logic circuits, and particularly to logic circuits which depend for their operation on the sudden change in resistivity of certain types of semiconductors under predetermined conditions of ambient temperature and applied electric field.

There is a need in the information handling field for circuits capable of very high speed response and recovery. Computers, for example, are called upon to handle large quantities of information in a relatively short time period. The operating speed of such machines is limited in part by the speed of response of the various components and circuits employed therein. Many logical operations are presently performed in a computer by circuits which depend for their operation on the non-linear characteristics of various passive elements (normally called diode logic). Most such circuits are characterized by signal attenuation which limits their usefulness in some applications.

Experimental work in the field of cryogenics has indicated the possibility of using superconducting rings as elements in a computer memory device. These rings have extremely small resistances that approach zero in value. In order that these memory elements may be efficiently supplied with information signals in the form of current pulses, they must be supplied from a low impedance source.

It is among the objects of this invention to provide:

A high speed logic circuit;

A circuit for performing logic with gain at high speed;

A high speed logic circuit which operates as a low impedance source for efficiently supplying current to a low impedance device;

A high speed logic circuit in which the input circuits are isolated from one another and from the output circuit; and An improved semiconductor amplifier.

Semiconductors are known to have relatively high resistivities at room temperature as compared to metals. Most semiconductors display a marked increased in resistivity at low temperatures. This is particularly true for extrinsic types of semiconductors whose electrical properties depend upon the presence of impurity substances defined in the art as donor and acceptor impurities. At low temperatures, the electric charge carriers, holes or electrons, present in extrinsic types of semiconductors attain relatively high mobilities. Mobility is a parameter of a charge carrier and is defined as the ratio of the charge carrier drift velocity to an electric field applied to the semiconductor.

As described in the copending application of Martin C. Steele Serial No. 667,597, filed June 24, 1957, now Patent No. 3,042,853, for Electrical Apparatus, in a semiconductor in a condition of high mobility, a relatively small field of the order of a few volts per centimeter can impart enough energy to the electric charge carriers, which are electrons or holes, to cause impact ionization of the donor impurities in the case of the electrons and of the acceptor impurities in the case of holes. The term "impact ionization," as used here, refers to a known phenomenon in which an atom of impurity substance when struck by a charge carrier, either a hole or an electron, moving under the stimulus of an electric field loses an electron or hole and becomes an ion.

When impact ionization occurs, the resistivity of the semiconductor sharply decreases due to the sudden increase in the number of electric charge carriers. This sudden change in resistivity, which is defined as the breakdown of the semiconductor, results in a sharp change in the output to input voltage characteristic of the semiconductor. The sudden decrease in resistivity causes a substantial increase in the flow of current through the semiconductor and over the electrical path in which the semiconductor is located.

The present invention provides a novel means for controlling the breakdown of the semiconductor and the resultant increase in output current. A body of semiconductive material of the type described is provided with a plurality of electrodes. Energizing pulse means and an output load are serially connected between two of these electrodes. An input pulse circuit means is connected to another electrode which is, preferably, between the other two electrodes. The energizing pulses provide an electric field across the body. In the preferred mode of operation, the circuit is so arranged and the amplitude and duration of the energizing pulses so adjusted that impact ionization occurs in only a portion of the semiconductive body in the absence of an input pulse, and only a very small output current results. When an input pulse is applied in proper time relationship to the energizing pulse, breakdown of the body between the energizing pulse means and the output load is controlled so that a large current output is obtained during a portion of the energizing pulse duration.

The foregoing and other objects, the advantages and novel features of this invention, as well as the invention itself both as to its organization and mode of operation, may be best understood from the following description when read in connection with the accompanying drawing in which like reference numerals refer to like parts and in which:

FIGURE 1 is a schematic diagram of a circuit described in the copending application which is presented here as an aid in understanding the present invention;

FIGURES 2*a* and 2*b* are graphs showing the variation of resistivity with temperature for a semiconductive material such as germanium;

FIGURE 2*c* is a family of curves illustrating the current-time relationship of the semiconductive material for different magnitudes of applied electric field.

Figures 1, 2A, 2B, 2C, 3, 4:
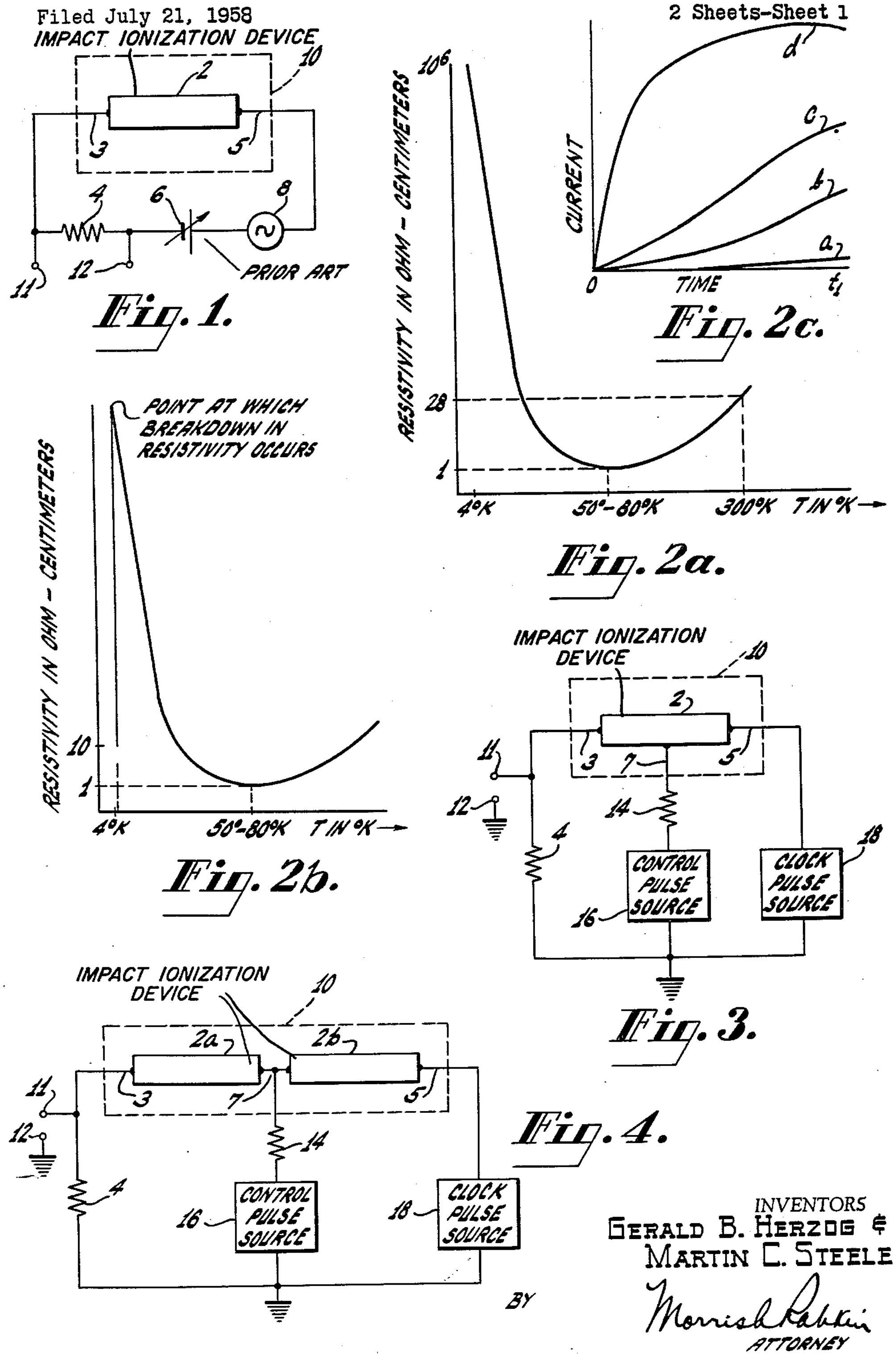
FIGURE 3 is a block and schematic diagram of a preferred embodiment of the present invention.
FIGURE 4 illustrates a modification of the embodiment of FIGURE 3.

There is illustrated in FIGURE 1 a circuit which is described in the copending application referred to above. The circuit is here presented as an aid in understanding the present invention. A body of semiconductive material 2 is connected in series with a signal source 8, a direct current voltage source 6, and a load, illustrated as a resistor 4. The semiconductive material is of the type which has a relatively steep resistivity versus temperature characteristic and in which the resistivity sharply changes under certain conditions of applied voltage and ambient temperature. Crystalline semiconductive materials, such as n or p-types of germanium, are among the types of materials which are suitable. The signal source 8 may consist of any means for producing a signal which it is desired to rectify. The direct current voltage source 6 is preferably adjustable and is shown in the figure as a battery. The electrodes 3, 5 may be connected to the semiconductor body 2 by any of several well-known techniques, such as soldering to vapor-deposited metal coatings on the semiconductor body or to coatings formed of a cured silver paste.

The body 2 is located in a low temperature environment indicated schematically by the dashed box 10. The box may represent a liquid helium cryostat or other means for maintaining the body 2 at a low temperature. Liquid helium liquifiers are commercially available as are double Dewar flasks which use liquid nitrogen in the outer Dewar and liquid helium in the inner Dewar, and lose less than one percent of their liquid helium per day. When a material such as germanium is used as the semiconductor, an upper temperature limit of 25° to 30° Kelvin (K.) is feasible although lower temperatures may be employed. It is believed unnecessary to discuss in detail the means for maintaining the semiconductive material at low temperatures. These are described in general in an article entitled, "Low Temperature Electronics," in the Proceedings of the IRE, volume 42, pages 408, 412, February 1954, and in other publications.

The graph of FIGURE 2*a* shows in brief how the resistivity of a body of semiconductive material, such as a particular sample of germanium, varies with temperature in the presence of an electric field less than that required to produce breakdown. In FIGURE 2*a*, absolute temperature T is plotted as the abcissa, and the logarithm of the resistivity is plotted as the ordinate. At room temperature, this sample of germanium has a resistivity of approximately 28 ohm-centimeters. The resistivity reaches a minimum value at a temperature of about 50 degrees K. and then rises rapidly to approximately $10^6$ ohm-centimeters at about 4° K. Note that at very low temperatures only a relatively small increment in temperature is required to rapidly change the resistivity.

FIGURE 2*b* is a graph showing how the resistivity of the same sample of semiconductive material shown in FIGURE 2*a* is sharply decreased when an electrical field of sufficient amplitude is applied to the sample after its temperature has been lowered to a value at which breakdown can occur. Down to a temperature of about 4.2° K. the curve is the same as the one shown in FIGURE 2*a*. When an electric field is applied at that temperature, the charge carriers obtain such high mobilities from the electric field that they cause impact ionization of the donors or acceptors. When this occurs, the high value of resistivity, which may be of the order of $10^6$ ohm-centimeters (the exact value depending upon the temperature of the sample prior to breakdown) changes extremely sharply to a very low value of resistivity of the order of 10 ohm-centimeters.

When an electric field of a magnitude sufficient to cause breakdown is suddenly applied between two electrodes of a semiconductor, the current does not immediately attain a maximum value. A finite time interval is required during which increasing numbers of charge carriers are generated, and during which the resistivity of the body between these electrodes is correspondingly decreased. This time interval is a function of the voltage gradient and other factors, and may be shortened by increasing the magnitude of the applied electric field. This phenomenon is illustrated in FIGURE 2*c*. Each of the curves *a*–*d* shows the current as a function of time for a different magnitude of electric field applied at time zero for a duration of time $t_1$. The electric field magnitudes increase in value from curve *a* through curve *d*.

FIGURE 3 illustrates a preferred embodiment of the present invention. A clock pulse source 18 providing energizing pulses is connected between one electrode 5 of the body 2 and a point of reference potential, illustrated as circuit ground. This pulse source 18 may be, for example, a pulse generator, the output of which may be transformer coupled to the circuit with the secondary of a pulse transformer connected between the electrode 5 and the reference point. An output load 4, illustrated as a resistor, is connected between another electrode 3 and the reference point. One of a pair of output terminals 11, 12 is connected to the electrode side of the load 4, the other terminal 12 being returned to the reference point. Another electrode 7 is affixed to the body 2, preferably between the other electrodes 3, 5. A control or input circuit comprising the series combination of an impedance element 14, such as a resistor, and a control pulse source 16 is connected between the intermediate electrode 7 and the point of reference potential. The input or control pulse source 16 may be, for example, a circuit such as a "flip-flop", and the pulses may be coupled to the control circuit by any suitable means. In the description of this circuit and those yet to be described, the electrodes 3, 5, 7 will be referred to for convenience as output, energizing, and control electrodes, respectively. The electrodes are preferably connected to the body by ohmic contacts. The body 2 is immersed in a low temperature environment by means represented by the dashed box 10. The temperature is adjusted so that the body 2 has a high resistivity in the absence of an applied electric field. The electric field is provided by the energizing pulses from the clock pulse source 18.

When an energizing pulse of "breakdown" magnitude is applied to the body 2 from the clock pulse source 18, the initial internal impedance of the body 2 between the output electrode 3 and the energizing electrode 5 is extremely large compared to the impedances of the resistors 4, 14, and the current flow is very small. For this reason, the initial voltage at the control electrode 7 is approximately the same as the reference potential, and the electric field created by the energizing pulse appears almost entirely between the control electrode 7 and the energizing electrode 5. The electric field causes impact ionization between these electrodes 7, 5, and the current builds up in response to the increasing number of generated charge carriers and the correspondingly reduced resistivity. This current flows through the control circuit almost in its entirety, load current being negligible due to the additional high internal impedance between the output and control electrodes 3, 7. The voltage drop across the control circuit resistor 14 increases with increasing current flow therethrough, the voltage at the control electrode 7 changing accordingly. When the latter voltage attains a magnitude such that the electric field, or voltage gradient, between the output and control electrodes 3, 7 reaches the critical value, breakdown occurs between these electrodes 3, 7 and a large current flows through the output load 4.

The time delay between the application of the energizing pulse and output current flow depends upon the rate of current build-up between the control and energizing electrodes 7, 5. As described heretofore, the rate of current build-up may be increased by increasing the voltage gradient between these electrodes 7, 5. This may be accomplished, for example, by the application of an input or control pulse of a polarity opposite that of the energizing pulse. The input pulse may be applied immediately preceding or during the duration of the energizing pulse. The result is to increase the electric field between these electrodes 7, 5 and hasten the current build-up. The voltage at the control electrode 7 changes at a faster rate in response to this increased rate of current build-up, and the electric field between the output and control electrodes 3, 7 reaches the critical value with less delay.

In the preferred mode of operation of the present invention, the amplitude and duration of the energizing pulse are adjusted so that impact ionization cannot occur between the output and control electrodes 3, 7 in the absence of an input, or control, pulse from the control pulse source 16, Under these circumstances, only a negligible output appears across the load 4. When an input pulse is also applied, however, impact ionization occurs between these electrodes 3, 7 and a large current flows in the output circuit. If the impedance of the output circuit is small compared to that of the control circuit, most of the current will flow in the output circuit after breakdown. The latter current may be 1000 times greater than the output current which flows in the absence of the input pulse. It is thus seen that a small input pulse controls a large output current, and the circuit is thus capable of high current gain. Because the impedance of the body 2 falls to a low value in response to impact ionization, this circuit is ideally suited for supplying current to a low impedance output load. Such a load may be, for example, a superconducting element.

In one arrangement according to the present invention, millimicrosecond gating was performed with power gain in excess of 15 decibels when supplying a load 4 of 75 ohms. The circuit employed a body 2 of n-type germanium having a length of 10 millimeters and a cross-section 1 millimeter by 2 millimeters. The resistivity of the body 2 measured 0.6 ohm-centimeter at room temperature. A pulse of 15 volts amplitude was applied to the energizing electrode 5, and a pulse of 2 volts amplitude was applied to the input electrode 7 through a 7000 ohm resistor 14. The temperature was maintained at 4.2° K.

This circuit may be used to perform computer logic with gain at very high speeds. For example, if the energizing and control pulses represent first and second inputs, respectively, the circuit performs the logic of an "and" gate. An "and" gate is well-known in the art as a circuit or gate having an output only when every input is in its prescribed state. An "and" gate performs the function of the logical "and."

At the termination of the energizing pulse, the body 2 returns to a state of high resistivity almost immediately if the impurity concentration of the material is properly selected. Decay time of less than one millimicrosecond has been measured.

The circuit of FIGURE 3 may be modified by replacing the single body 2 of semiconductive material with two bodies 2*a*, 2*b*, as illustrated in FIGURE 4. The bodies 2*a*, 2*b* are electrically connected through a negligible impedance to form the equivalent of a single body. The control electrode 7 is the common connection which joins the two bodies 2*a*, 2*b*. In different applications, it may be desirable to locate the control electrode 7 at different intermediate positions on the body. This would require a plurality of various sized bodies 2*a*, 2*b*, if the arrangement of FIGURE 4 were used. For this reason and others, the circuit of FIGURE 3 is preferred to that of FIGURE 4. The operation of the circuits is the same, however.

Figure 5:
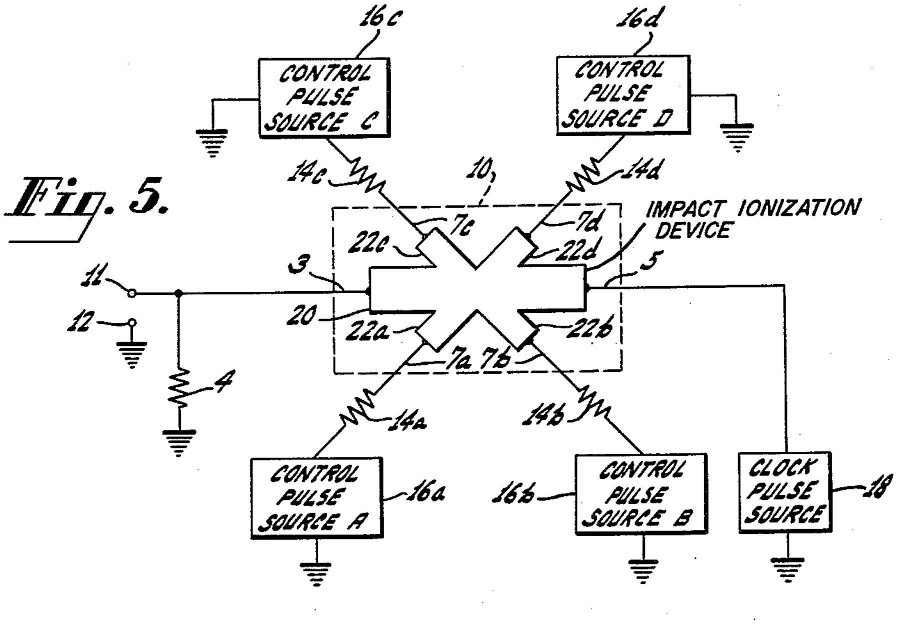
FIGURE 5 is a block and schematic diagram of another embodiment of the present invention.

FIGURE 5 illustrates another embodiment of the present invention. The configuration of the semiconductive body 2 of FIGURE 3 has been altered to provide a body 20 having a plurality of projecting side "arms" 22*a*–22*d*. A different control electrode 7*a*–7*d* is connected to each of the "arms" 22*a*–22*d* by one of the methods previously described. The number of projecting arms 22*a*–22*d* and control electrodes 7*a*–7*d* has been selected arbitrarily for illustrative purposes only. Other numbers may be employed depending upon the particular application. Each of the control electrodes 7*a*–7*d* is returned to the point of reference potential through a different impedance element 14*a*–14*d* and a different control pulse source 16*a*–16*d*. The control electrodes 7*a*–7*d* could, alternatively, be connected to a semiconductive body having the same configuration as shown in FIGURE 3. The former method is preferred, however, because it affords better isolation between the control circuits, and also between the control circuits and the output circuit. The side "arms" 22*a*–22*d* function as high impedance devices in the absence of breakdown therein. The operation of the circuit is similar to that of the previously described circuit of FIGURE 3, except that input pulses may be provided from any of the control pulse sources 16*a*–16*d*. This circuit is also capable of performing computer logic with gain at very high speed. The circuit may represent a logical "or" circuit or gate. An "or" gate is well-known as a circuit having an output and a multiplicity of inputs so designed that the output is energized whenever one or more inputs are energized. Because of the low impedance of the body 20 after breakdown, a low impedance output load 4 may be selected for maximum current and power gain.

Figure 6:
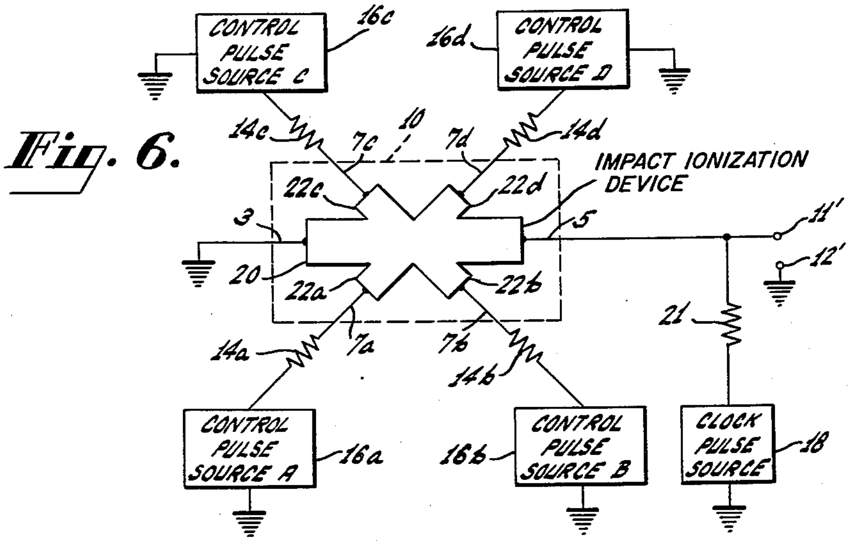
FIGURE 6 is a modification of the embodiment illustrated in FIGURE 5.

FIGURE 6 illustrates a modification of the circuit of FIGURE 5. In this circuit, an impedance 21, illustrated as a resistor, is connected in the energizing circuit. That is to say, it is serially connected with the clock pulse source 18 between the energizing electrode 5 and the reference point. The other end electrode 3 and one of the output terminals 11′, 12′ are connected to the point of reference potential. The other output terminal 11′ is connected to the energizing electrode 5. This circuit operates in a manner similar to that of FIGURE 5 except that the output appearing across the terminals 11′, 12′ is high in response to an energizing pulse in the absence of an input pulse, and low in the presence of an input pulse. The circuit performs the function of a 4 input "nor" gate. It will be understood by those skilled in the art that this invention may be practiced using other numbers of control or input electrodes, the particular number illustrated having been selected for illustrative purposes only.

There has been shown and described a rise time controlled impact ionization amplifier which can perform computer logic with gain at high speed. It can be shown that all necessary computer functions can be performed by suitable combinations of circuits of the type described.

What is claimed is:

1. In combination, an impact ionization device; means for maintaining said device at a temperature at which impact ionization can occur; means for applying to said device a first energizing pulse having an amplitude greater than that required to produce impact ionization and a duration less than that required to permit an appreciable amount of such impact ionization; and means for applying a second energizing pulse to said device in such time relation to said first pulse and in such a sense as to hasten the current build-up.

2. In combination, an impact ionization device; means for maintaining said device at a temperature at which impact ionization can occur; means for applying a first energy pulse to said device having an amplitude greater than that required to produce impact ionization and a duration less than that required to permit an appreciable amount of such impact ionization; and means for applying a second energy pulse to said device during the application of said first pulse in a sense to hasten the arrival of said appreciable amount of impact ionization.

3. In the combination as set forth in claim 2, at least one of said pulses being a voltage pulse.

4. In the combination as set forth in claim 2, said impact ionization device having three ohmic electrodes, one of said pulses being applied to one electrode and the second to another electrode.

5. In combination, an impact ionization semiconductor device; means for maintaining said device at a temperature at which impact ionization can occur; means for applying a first energy pulse to said device having an amplitude greater than that required to produce impact ionization, whereby appreciable impact ionization will occur after a time $t$, provided the pulse has a duration at least equal to $t$, where $t$ is a parameter which depends upon the pulse amplitude; and means for applying a voltage pulse to said device during the application of said first pulse in order to produce said appreciable impact ionization at a time $t-\Delta t$, where $\Delta t$ is a parameter which depends upon the amplitude of the second applied pulse.

6. In combination, a semi-conductor body which exhibits a sharp change in resistivity due to impact ionization under certain conditions of temperature and electric field; means for maintaining the temperature of said body at one of said conditions; means for applying an electric field across said body having a value greater than that required to produce said change in resistivity; and means for applying a voltage pulse to the body during the application of said electric field in order to change the time required to produce said sharp change in resistivity.

7. In combination, an impact ionization device; means for maintaining said device at a temperature at which impact ionization can occur; means for applying a first energy pulse to said device having an amplitude greater than that required to produce impact ionization, whereby appreciable impact ionization will occur after a time $t$, provided the pulse has a duration at least equal to $t$, where $t$ is a parameter which depends upon the pulse amplitude; and means for applying a second energy pulse to said device in such time relation to said first pulse as to produce said appreciable impact ionization at a time $t-\Delta t$, where $\Delta t$ is a parameter which depends upon the amplitude of said second pulse.

8. In combination: a semiconductor impact ionization device; means for maintaining said device at a temperature at which impact ionization can occur; first energy pulse input means and an output load serially connected in a closed loop between two points of said device; and a second energy pulse means connected between a third point on said device and a point on said loop.

9. The combination comprising a device of one conductivity type semiconductor material of the type which exhibits a breakdown in resistivity due to impact ionization under certain conditions of temperature and applied electric field, means for adjusting the temperature of said device to one of said certain conditions, a plurality of electrodes affixed to said device by ohmic contacts, a point of reference potential, a first one of said electrodes being connected to said reference point, means connected between a second one of said electrodes and said reference point for providing an electric field between said first and second electrodes, and control signal means connected between a third one of said electrodes and said reference point for controlling the distribution of said electric field.

10. An impact ionization amplifier comprising, in combination, a body of one conductivity type semiconductive material which exhibits a sharp change in resistivity due to impact ionization under certain conditions of temperature and electric field, means for adjusting the temperature of said body to a low value of temperature, a plurality of ohmic contact electrodes affixed to said body, a point of reference potential, an output load connected between a first of said electrodes and said point, energizing pulse means connected between a second one of said electrodes and said point for applying to said second electrode energizing pulses of sufficient amplitude to create an electric field of sufficient magnitude to cause impact ionization at said low value of temperature, and a control circuit connected between a third one of said electrodes and said point and including means for applying energy pulses to said third electrode to hasten the arrival of said sharp change in resistivity.

11. An impact ionization amplifier comprising, in combination, a body of semiconductive material which exhibits a sharp change in resistivity due to impact ionization under predetermined conditions of low temperature and electric field, means for adjusting the temperature of said body to a low value of temperature, a plurality of electrodes affixed to said body by ohmic contacts, a point of reference potential, an output load connected between a first of said electrodes and said point, energizing pulse means connected between a second of said electrodes and said point for applying to said second electrode pulses of sufficient magnitude to cause impact ionization at said low temperature between said first and second electrodes and of duration less than that required to provide an appreciable amount of such impact ionization, and a control pulse means connected between said third electrode and said point for applying to said third electrode pulses providing appreciable impact ionization during said duration.

12. In combination, two bodies of semiconductive material of the type which exhibits a sharp change in resistivity due to impact ionization under certain conditions of temperature and electric field, means for adjusting the temperatures of said bodies to one of said conditions, each of said bodies having a pair of electrodes attached thereto, one electrode of each said pair being connected together through a negligible impedance, a point of reference potential, the other electrode of one said pair being connected to said reference point, energizing pulse means connected between the other electrode of the other said pair and said reference point, and a control pulse means connected between said one electrode and said reference point.

13. In combination, a body of one conductivity type semiconductive material which exhibits a sharp change in resistivity due to impact ionization under certain conditions of temperature and applied field, a plurality of electrodes affixed to said body, a common reference point, means connecting one of said electrodes to said common point, an energizing signal means connected between a second electrode and said common point, said signal means providing an electric field of sufficient amplitude to cause said sharp change in resistivity of said body at certain values of temperature, means for adjusting the temperature of said body to one of said certain values, and a plurality of control circuits each including a separate control pulse means connected between a different one of the other electrodes of said plurality and said common point.

14. In combination, an impact ionization device comprising a body of one conductivity type semiconductive material, means for maintaining said device at a temperature at which impact ionization can occur, a plurality of electrodes affixed to said body by ohmic contacts, an energizing signal means and an output load serially connected between two of said electrodes, and a plurality of separate control means each for applying voltage pulses selectively between a different one of said electrodes and said two electrodes.

15. The combination comprising a body of one conductivity type semiconductive material having projecting arms, said material being of a type which exhibits a sharp breakdown in resistivity due to impact ionization, means for maintaining said body at a temperature at which impact ionization can occur, first and second ohmic electrodes affixed to said body, a plurality of other electrodes each affixed by an ohmic contact to a different one of said arms, means connected between said first and second electrodes for providing an electric field therebetween, and a plurality of control means each connected to a different one of said other electrodes for independently varying the voltage of any of said other electrodes to control the distribution of said electric field.

(References on following page)

References Cited in the file of this patent

UNITED STATES PATENTS

| | | |
|---|---|---|
| 2,533,908 | Andrews | Dec. 12, 1950 |
| 2,659,868 | Ericsson et al. | Nov. 17, 1953 |
| 2,702,838 | Haynes | Feb. 22, 1955 |
| 2,725,474 | Ericsson et al. | Nov. 29, 1955 |
| 2,736,858 | Welker | Feb. 28, 1956 |
| 2,769,926 | Lesk | Nov. 6, 1956 |
| 2,805,347 | Haynes et al. | Sept. 3, 1957 |
| 2,851,615 | Sziklai et al. | Sept. 9, 1958 |
| 2,891,160 | Leblond | June 16, 1959 |
| 2,900,531 | Wallmark | Aug. 18, 1959 |
| 2,979,668 | Dunlap | Apr. 11, 1961 |

OTHER REFERENCES

Sclar and Burstein, "Impact Ionization of Impurities in Germanium," Journal of Physics and Chemistry of Solids, vol. 2, March 1957, pp. 1–23 (pp. 5 and 16 relied on).